UNITED STATES PATENT OFFICE.

ADOLF HEINEMANN, OF WORMS, GERMANY.

PROCESS OF HUSKING KERNELS OR SEEDS AND OBTAINING PRODUCTS THEREFROM.

1,051,582.　　　　Specification of Letters Patent.　　Patented Jan. 28, 1913.

No Drawing.　　　　Application filed July 17, 1912. Serial No. 710,076.

*To all whom it may concern:*

Be it known that I, ADOLF HEINEMANN, a subject of the Emperor of Germany, and resident of Worms-on-the-Rhine, Germany, have invented certain new and useful Improvements in Connection with the Husking of Kernels or Seeds and the Obtainment of Products Therefrom, of which the following is a specification.

The object of this invention is to remove the husks, or coverings, from kernels, or seeds, in an economical and generally satisfactory manner, and it is especially intended for husking the kernels, or seeds, of the St. John's bread, or carob, tree (*Ceratonia siliqua*) from which a valuable substance is obtained which is useful in the textile industry as it has great swelling capacity which renders it especially suitable for use as a thickener. The extraction of this substance as hitherto practised is rendered very difficult owing to the kernels, or seeds, being surrounded by husks, or coverings, which contain coloring matter, and the swelling capacity of the said kernels, or seeds, is a great drawback in the removal of the husks, or coverings, and causes great losses when the kernels, or seeds, are treated with either steam, or water. Various processes for the removal of the husks, or coverings, from such kernels, or seeds, have been described, most of such processes consisting in mechanical methods which are not satisfactory in view of the shapes of the kernels, or seeds, and the firm adherence of their husks, or coverings. According to another process it has been proposed to husk the kernels, or seeds, by treatment with steam, but this is ineffectual on account of the swelling of the kernels, or seeds, and their adherence to the husks, or coverings.

The process according to the present invention enables the husking to be effected so that the husked kernels, or seeds, are very efficiently obtained in a pure condition and so that there is a minimum of waste.

I have found that sulfuric acid can be employed with good effect to husk the kernels, or seeds, the acid having a rapid dissolving action on the husks, or coverings, even at ordinary temperatures, but the kernels, or seeds, being soluble but slowly and imperfectly in the acid. By this means the husks, or coverings, dissolved in the acid are, if the liquor is diluted by water as hereinafter described, converted into a voluminous and highly porous mass which (on account of its great porosity) can be used as an absorbent for many purposes.

This invention can be carried out for example as follows, but it is not limited to this precise example: 100 kilograms of the kernels, or seeds, of St. John's bread are immersed in 200 kilograms of sulfuric acid and stirred briskly therein for about five hours. Sulfuric acid containing at least 75 per cent. of $H_2SO_4$ should be used, as acid containing less than this percentage dissolves so little of the husks, or seeds, and acts so slowly that, even when the time of action is prolonged, the effect is insufficient and practically worthless. I have found that sulfuric acid containing from 80 to 85 per cent. of $H_2SO_4$ is most suitable for use, as acid of this concentration acts quickly in dissolving the husks, or coverings. The use of more concentrated acid is possible, but unsuitable, as it is expensive and the reaction mass becomes readily heated and gives rise to extraneous reactions which reduce the yield. Artificial cooling might be resorted to in using this more concentrated sulfuric acid, but this would entail useless trouble and expense. Furthermore the volume of the more concentrated acid is always less than that of the more dilute acid and in steeping the kernels, or seeds, there would have to be employed, in order to avoid thickening and caking of the reacting mass, more 90 to 95 per cent. acid than would be necessary for the dissolving effect. For instance in the example given, at least 220 kilograms of the more concentrated acid would have to be used in order to obtain the same fluidity of the reaction mass as is obtained with 200 kilograms of acid of from 80 to 85 per cent.

The duration of the reaction can be increased and even as much as doubled without practically affecting the yield. The form of the vessel in which the operation is conducted and the mode of stirring will to some extent affect the time occupied in the process. Too long a duration of the operation is inadvisable, as then part of the kernels, or seeds, would be gradually dissolved. As long as no material heating takes place, the difference between the solubility of the husks, or coverings, and of the kernels, or seeds, is so great that it is of no importance whether the duration of the reaction takes, say, two hours longer, or not.

As the dissolved husks, or coverings, are slimy and sticky, it is necessary, from the first, to carefully and constantly stir the mass to prevent the kernels, or seeds, adhering together, or to the vessel, as if they did so, the parts at which the kernels, or seeds, adhered would not be properly acted upon. Ordinary temperature should be employed and extraneous heating, or even self-heating, of the reaction mass should be carefully avoided, for any such heating would injuriously affect the yield considerably.

At the end of say five hours, the thick black sulfuric acid liquor is drawn off, or removed, by suction or otherwise, and diluted with its own volume of water. Large quantities of black product are thereby precipitated which product is freed from the sulfuric acid by washing and then dried. As already stated, this black reaction product is, on account of its great absorption power, useful for many absorption purposes as for instance replacing kieselguhr or infusorial earth in preparing dynamite. The sulfuric acid filtered off is of about 40 per cent. concentration and fairly pure. In any case it can be used after concentration for a further operation. The kernels, or seeds, which have been deprived, as far as possible, of the sulfuric acid, are then washed with cold water (with the use of brushes if desired) when they assume a pure yellowish-white color. The further treatment of the kernels, or seeds, may be carried out in accordance with the usual methods and presents no difficulties.

I claim:

1. The herein described process of husking the kernels of St. John's bread comprising treating the kernels with sulfuric acid to dissolve the husks, and withdrawing the liquor containing the dissolved husks.

2. The herein described process of preparing the kernels of St. John's bread for use in the textile industry comprising treating the kernels with sulfuric acid to dissolve the husks, withdrawing the liquor containing the dissolved husks, and washing and drying the husked kernels.

3. The herein described process of preparing the kernels of St. John's bread for use in the textile industry comprising treating the kernels with sulfuric acid, of at least 75 per cent. concentration, withdrawing the liquor containing the dissolved husks, and washing and drying the husked kernels.

4. The herein described process of treating the kernels of St. John's bread comprising treating the kernels with sulfuric acid to dissolve the husks, withdrawing the liquor containing the dissolved husks, diluting such liquor with water, separating the precipitated product from the diluted liquor, and washing and drying the precipitated product.

5. The herein described process of treating the kernels of St. John's bread comprising stirring a mixture of said kernels and sulfuric acid at ordinary temperature for several hours, withdrawing the liquor containing the dissolved husks, diluting such liquor with water, separating the precipitated product from the diluted liquor and washing and drying the precipitated product.

6. The herein described process of treating the kernels of St. John's bread comprising stirring a mixture of said kernels and sulfuric acid at ordinary temperature for several hours, withdrawing the liquor containing the dissolved husks, and washing and drying the husked kernels.

In testimony whereof I have signed my name to this specification in the presence of two subscribing witnesses.

ADOLF HEINEMANN.

Witnesses:
   Joseph Waskofen,
   Jean Grund.